US012562846B2

(12) United States Patent
Gao et al.

(10) Patent No.: US 12,562,846 B2
(45) Date of Patent: Feb. 24, 2026

(54) DOWNLINK RETRANSMISSION FOR MULTI-TRP/PANEL TRANSMISSION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 395 days.

(21) Appl. No.: 17/607,647

(22) PCT Filed: Apr. 30, 2019

(86) PCT No.: PCT/CN2019/085372
§ 371 (c)(1),
(2) Date: Oct. 29, 2021

(87) PCT Pub. No.: WO2020/220348
PCT Pub. Date: Nov. 5, 2020

(65) Prior Publication Data
US 2022/0209902 A1     Jun. 30, 2022

(51) Int. Cl.
*H04L 1/1812*          (2023.01)
*H04L 1/1867*          (2023.01)
(Continued)

(52) U.S. Cl.
CPC .......... *H04L 1/1819* (2013.01); *H04L 1/1893* (2013.01); *H04L 5/0044* (2013.01); *H04L 5/0051* (2013.01); *H04W 72/23* (2023.01)

(58) Field of Classification Search
CPC .................................................. H04L 1/1819
See application file for complete search history.

(56) References Cited

U.S. PATENT DOCUMENTS 11,284,381 B2 *   3/2022   Park ...................... H04B 7/024
2019/0044666 A1   2/2019   Li
(Continued)

FOREIGN PATENT DOCUMENTS

CN        107995654 A      5/2018
CN        108600507 A      9/2018
(Continued)

OTHER PUBLICATIONS

Office Action issued Mar. 7, 2023 in Japanese Application No. 2021-563314.
(Continued)

*Primary Examiner* — Jason E Mattis
(74) *Attorney, Agent, or Firm* — Sughrue Mion, PLLC

(57) ABSTRACT

Embodiments of the present disclosure relate to methods, devices and apparatuses for downlink retransmission for multi-TPR/panel transmission. In an embodiment of the present disclosure, a feedback for a downlink transmission is received from a terminal device, wherein in the downlink transmission, a data block is divided into at least a first data part and a second data part, the first data part is mapped to a first set of layers and a second data part is mapped to a second set of layers, and the first data part and the second data part are transmitted with different transmission configuration indication (TCI) states. A downlink retransmission of at least one of the first data part and the second data part is performed, in response to the feedback indicating a transmission failure, with the at least one of the first data part and the second data part being mapped to a different set of layers from one used in the downlink transmission. With
(Continued)

embodiments of the present disclosure, it is possible to obtain more diversity gain, thereby achieving better retransmission performance for the multi-TPR/panel transmission.

16 Claims, 9 Drawing Sheets

(51) Int. Cl.
    *H04L 5/00*          (2006.01)
    *H04W 72/23*      (2023.01)

(56) References Cited

U.S. PATENT DOCUMENTS

| | | | |
|---|---|---|---|
| 2019/0089494 A1 | 3/2019 | Park et al. | |
| 2019/0261347 A1 | 8/2019 | Harada et al. | |
| 2020/0106584 A1* | 4/2020 | Jiang ..................... | H04L 5/0053 |
| 2020/0267748 A1* | 8/2020 | Khoshnevisan ...... | H04W 76/15 |
| 2022/0022238 A1* | 1/2022 | Chen .................... | H04B 7/0689 |
| 2022/0029750 A1 | 1/2022 | Matsumura et al. | |
| 2022/0104237 A1* | 3/2022 | Muruganathan ...... | H04W 72/51 |
| 2022/0116183 A1* | 4/2022 | Gao ...................... | H04L 1/1812 |

FOREIGN PATENT DOCUMENTS

| | | |
|---|---|---|
| CN | 109792314 A | 5/2019 |
| WO | 2018/088538 A1 | 5/2018 |
| WO | 2018/203621 A1 | 11/2018 |
| WO | 2018/203705 A1 | 11/2018 |
| WO | 2020/166025 A1 | 8/2020 |

OTHER PUBLICATIONS

ZTE, "Enhancements on Multi-TRP and Multi-panel Transmission", 3GPP TSG RAN WG1 #96bis, R1-1904013, Apr. 8-12, 2019, Xi'an, China, pp. 1-13 (14 pages total).

NTT Docomo, Inc, "Enhancements on multi-TRP/panel transmission", 3GPP TSG RAN WG1 #96bis, R1-1904966, Apr. 8-12, 2019, Xi'an, China (19 pages total).

Office Action issued Apr. 22, 2023 in Chinese Application No. 201980095930.0.

Qualcomm Incorporated, "Multi-TRP Enhancements", 3GPP TSG-RAN WG1 Meeting #96b, R1-1905026, Apr. 8-12, 2019, 29 pgs., Xi'an, China.

International Search Report for PCT/CN2019/085372 dated, Dec. 30, 2019 (PCT/ISA/210).

Written Opinion of the International Searching Authority for PCT/CN2019/085372 dated, Dec. 30, 2019 (PCT/ISA/237).

JP Office Action for JP Application No. 2024-020811, mailed on Apr. 30, 2025 with English Translation.

JP Office Action for JP Application No. 2024-020811, mailed on Oct. 28, 2025 with English Translation.

Huawei et al., "Enhancements on Multi-TRP/panel transmission", 3GPP TSG RAN WG1 #96 R1-1901567, Feb. 25-Mar. 1, 2019.

Qualcomm incorporated, "Multi-TRP Enhancements", 3GPP TSG RAN WG1 #95 R1-1813442, Nov. 12-16, 2018.

CATT, "Consideration on multi-TRP/panel transmission", 3GPP TSG RAN WG1 adhoc_NR_AH_1901 R1-1900339, Jan. 21-25, 2019.

NTT Docomo, Inc., "Discussion on multi-beam enhancement", 3GPP TSG RAN WG1 #96b R1-1904967, Apr. 8-12, 2019.

* cited by examiner

100

| | One Codeword | | | | Two Codewords | | |
|---|---|---|---|---|---|---|---|
| Value | Number DMRS CDM group(s) without data | DMRS port(s) (for 1st TCI; for 2nd TCI) | Number of front-load symbols | Value | Number DMRS CDM group(s) without data | DMRS port(s) (for 1st TCI; for 2nd TCI) | Number of front-load symbols |
| 0 | 2 | 0; 2 | 1 | 0 | 2 | 0,1; 2,3,6 | 2 |
| 1 | 2 | 0,1; 2 | 1 | 1 | 2 | 0,1,4; 2,3 | 2 |
| 2 | 2 | 2,3 | 1 | 2 | 2 | 0,1,4; 2,3,6 | 2 |
| 3 | 2 | 0,1,2,3 | 1 | 3 | 2 | 0,1,4; 2,3,6,7 | 2 |
| 4 | 2 | 0; 2 | 2 | 4 | 2 | 0,1,4,5; 2,3,6 | 2 |
| 5 | 2 | 0,1; 2 | 2 | 5-31 | 2 | 0,1,4,5; 2,3,6,7 | 2 |
| 6 | 2 | 1; 2,3 | 2 | | | | |
| 7 | 2 | 1,2,3 | 2 | | | | |
| 8-31 | Reserved | Reserved | Reserved | | | | |

Newly added entries

Transmission Failure

TRP 220    TRP 230

TCI-a    TCI-b

UE 210

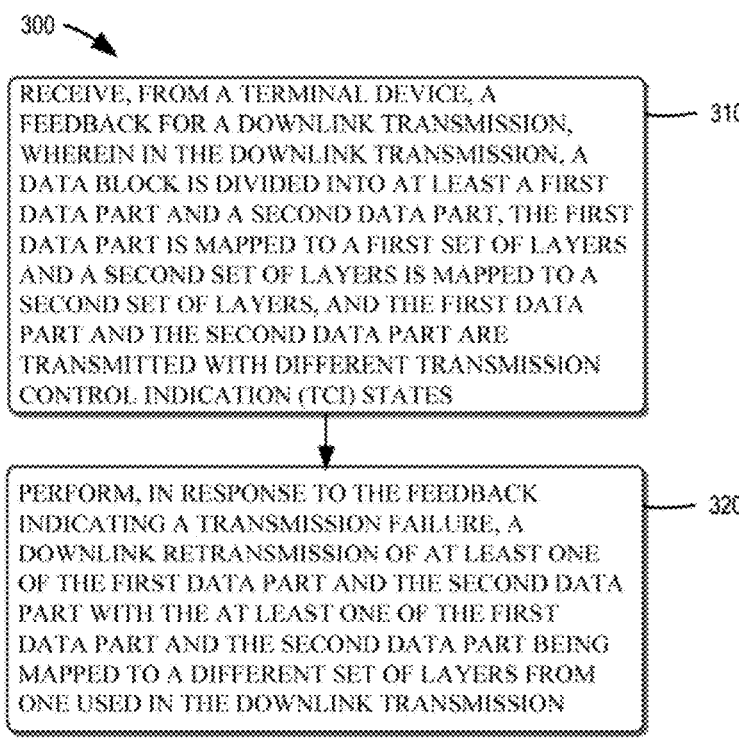

300

RECEIVE, FROM A TERMINAL DEVICE, A
FEEDBACK FOR A DOWNLINK TRANSMISSION,
WHEREIN IN THE DOWNLINK TRANSMISSION, A
DATA BLOCK IS DIVIDED INTO AT LEAST A FIRST
DATA PART AND A SECOND DATA PART, THE FIRST
DATA PART IS MAPPED TO A FIRST SET OF LAYERS
AND A SECOND SET OF LAYERS IS MAPPED TO A
SECOND SET OF LAYERS, AND THE FIRST DATA
PART AND THE SECOND DATA PART ARE
TRANSMITTED WITH DIFFERENT TRANSMISSION
CONTROL INDICATION (TCI) STATES — 310

PERFORM, IN RESPONSE TO THE FEEDBACK
INDICATING A TRANSMISSION FAILURE, A
DOWNLINK RETRANSMISSION OF AT LEAST ONE
OF THE FIRST DATA PART AND THE SECOND DATA
PART WITH THE AT LEAST ONE OF THE FIRST
DATA PART AND THE SECOND DATA PART BEING
MAPPED TO A DIFFERENT SET OF LAYERS FROM
ONE USED IN THE DOWNLINK TRANSMISSION — 320

Fig. 3

| PUCCH resource | State |
|---|---|
| 1 | TRP1 worse than TRP2 |
| 2 | TRP2 worse than TRP1 |

Fig. 6

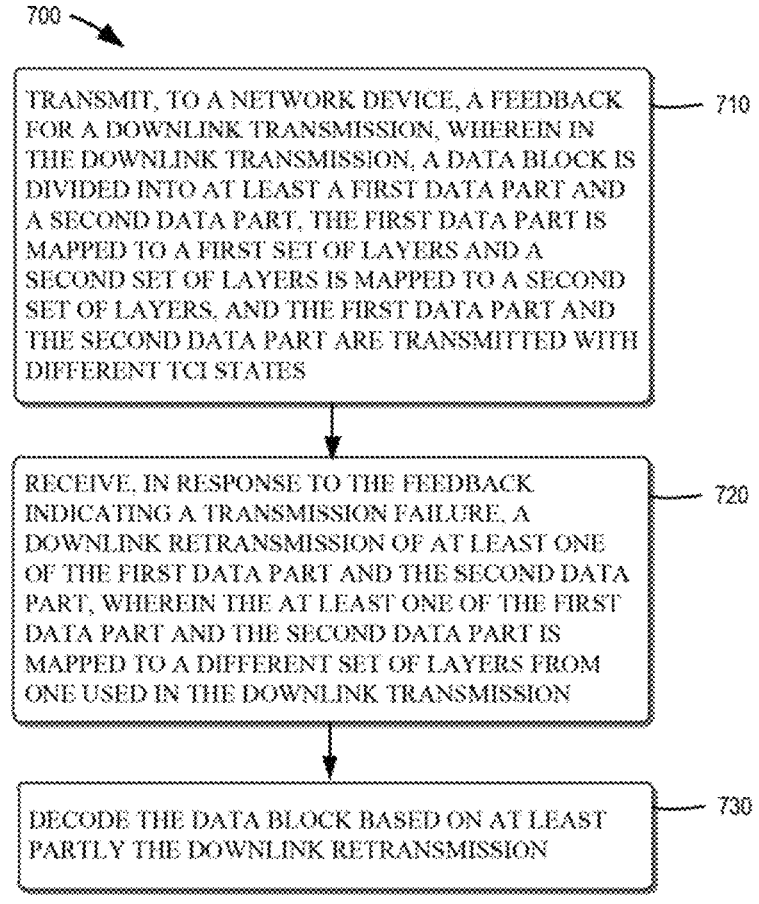

700

TRANSMIT, TO A NETWORK DEVICE, A FEEDBACK FOR A DOWNLINK TRANSMISSION, WHEREIN IN THE DOWNLINK TRANSMISSION, A DATA BLOCK IS DIVIDED INTO AT LEAST A FIRST DATA PART AND A SECOND DATA PART, THE FIRST DATA PART IS MAPPED TO A FIRST SET OF LAYERS AND A SECOND SET OF LAYERS IS MAPPED TO A SECOND SET OF LAYERS, AND THE FIRST DATA PART AND THE SECOND DATA PART ARE TRANSMITTED WITH DIFFERENT TCI STATES — 710

RECEIVE, IN RESPONSE TO THE FEEDBACK INDICATING A TRANSMISSION FAILURE, A DOWNLINK RETRANSMISSION OF AT LEAST ONE OF THE FIRST DATA PART AND THE SECOND DATA PART, WHEREIN THE AT LEAST ONE OF THE FIRST DATA PART AND THE SECOND DATA PART IS MAPPED TO A DIFFERENT SET OF LAYERS FROM ONE USED IN THE DOWNLINK TRANSMISSION — 720

DECODE THE DATA BLOCK BASED ON AT LEAST PARTLY THE DOWNLINK RETRANSMISSION — 730

Fig. 7

DOWNLINK RETRANSMISSION FOR MULTI-TRP/PANEL TRANSMISSION

CROSS REFERENCE TO RELATED APPLICATIONS

This application is a National Stage of International Application No. PCT/CN2019/085372 filed Apr. 30, 2019.

FIELD OF THE INVENTION

The non-limiting and exemplary embodiments of the present disclosure generally relate to the field of wireless communication techniques, and more particularly relate to a method, device and apparatus for downlink retransmission for multi-transmission and reception point (TRP)/panel transmission and a method, device and apparatus for wireless transmission for multi-TRP/panel transmission.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios, which includes requirements such as enhanced mobile broadband, massive machine-type communications, and ultra-reliable and low latency communications.

A discussion on multi-antenna technologies for the NR was started since May 2016 and it involves several aspects including multi-antenna scheme, beam management, Channel State Information (CSI) acquisition, and reference signal and quasi-co-located (QCL). Both single TRP transmission and multi-TRP/panel transmission may be supported in the NR system. However, for the multi-TRP/panel transmission, downlink control signaling enhancement(s) is required for efficient support of non-coherent joint transmission.

SUMMARY OF THE INVENTION

To this end, in the present disclosure, there is provided a new solution of downlink retransmission for the multi-TRP transmission, to mitigate or at least alleviate at least part of the issues in the prior art.

According to a first aspect of the present disclosure, there is provided a method for downlink retransmission. The method may be performed at a network device. The method may include receiving, from a terminal device, a feedback for a downlink transmission, wherein in the downlink transmission, a data block is divided into at least a first data part and a second data part, the first data part is mapped to a first set of layers and a second data part is mapped to a second set of layers, and the first data part and the second data part are transmitted with different transmission configuration indication (TCI) states; and performing, in response to the feedback indicating a transmission failure, a downlink retransmission of at least one of the first data part and the second data part with the at least one of the first data part and the second data part being mapped to a different set of layers from one used in the downlink transmission.

According to a second aspect of the present disclosure, there is provided a method for wireless transmission. The method may be performed at a terminal device. The method may include transmitting, to a network device, a feedback for a downlink transmission, wherein in the downlink transmission, a data block is divided into at least a first data part and a second data part, the first data part is mapped to a first set of layers and a second data part is mapped to a second set of layers, and the first data part and the second data part are transmitted with different TCI states; receiving, in response to the feedback indicating a transmission failure, a downlink retransmission of at least one of the first data part and the second data part, wherein the at least one of the first data part and the second data part is mapped to a different set of layers from one used in the downlink transmission; and decoding the data block based on at least partly the downlink retransmission.

According to a third aspect of the present disclosure, there is provided a network device. The network device may include a transceiver, and a processor, configured to perform or control the transceiver to, receive, from a terminal device, a feedback for a downlink transmission, wherein in the downlink transmission, a data block is divided into at least a first data part and a second data part, the first data part is mapped to a first set of layers and a second data part is mapped to a second set of layers, and the first data part and the second data part are transmitted with different transmission configuration indication (TCI) states; and perform, in response to the feedback indicating a transmission failure, a downlink retransmission of at least one of the first data part and the second data part with the at least one of the first data part and the second data part being mapped to a different set of layers from one used in the downlink transmission.

According to a fourth aspect of the present disclosure, there is provided a terminal device. The terminal device may include a transceiver; and a processor, configured to perform or control the transceiver to: transmit to a network device, a feedback for a downlink transmission, wherein in the downlink transmission, a data block is divided into at least a first data part and a second data part, the first data part is mapped to a first set of layers and a second data part is mapped to a second set of layers, and the first data part and the second data part are transmitted with different TCI states; receive, in response to the feedback indicating a transmission failure, a downlink retransmission of at least one of the first data part and the second data part, wherein the at least one of the first data part and the second data part is mapped to a different set of layers from one used in the downlink transmission and decode the data block based on at least partly the downlink retransmission.

According to a fifth aspect of the present disclosure, there is provided a network device. The network device may comprise a processor and a memory. The memory may be coupled with the processor and having program codes therein, which, when executed on the processor, cause the network device to perform operations of the method according to any embodiment according to the first aspect.

According to a sixth aspect of the present disclosure, there is provided a terminal device. The terminal device may comprise a processor and a memory. The memory may be coupled with the processor and have program codes therein, which, when executed on the processor, cause the terminal device to perform operations of the method according to any embodiment according to the second aspect.

According to a seventh aspect of the present disclosure, there is provided a computer-readable storage media with computer program codes embodied thereon, the computer program codes configured to, when executed, cause an apparatus to perform actions of the method according to any embodiment in the first aspect.

According to an eighth aspect of the present disclosure, there is provided a computer-readable storage media with computer program codes embodied thereon, the computer program codes configured to, when executed, cause an apparatus to perform actions of the method according to any embodiment in the second aspect.

According to a ninth aspect of the present disclosure, there is provided a computer program product comprising a computer-readable storage media according to the seventh aspect.

According to a tenth aspect of the present disclosure, there is provided a computer program product comprising a computer-readable storage media according to the eighth aspect.

With embodiments of the present disclosure, a new solution for downlink retransmission is provided, which makes it possible to obtain more diversity gain, thereby achieving better retransmission performance for a multi-TPR/panel transmission.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 3 illustrates a flow chart of a method for downlink retransmission at a network device according to some embodiments of the present disclosure;

FIG. 6 schematically illustrates an example transmission state indication table for two-TRP transmission according to some embodiments of the present disclosure;

FIG. 7 illustrates a flow chart of a method for wireless transmission at a terminal device according to some embodiments of the present disclosure.

DETAILED DESCRIPTION OF EMBODIMENTS

Figures 1, 2:
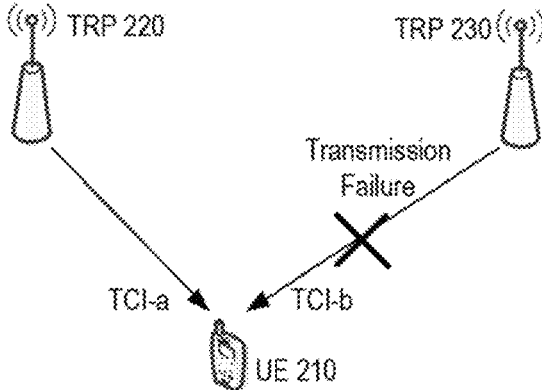
FIG. 1 illustrates an example DMRS table of multi-TRP/panel transmission in the prior art.
FIG. 2 illustrates an example scenario of multi-TRP transmission in which the present disclosure can be implemented.

Hereinafter, the solutions as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner. For example, features illustrated or described as part of one embodiment may be used with another embodiment to yield still a further embodiment. In the interest of clarity, not all features of an actual implementation are described in this specification.

In the accompanying drawings, various embodiments of the present disclosure are illustrated in block diagrams, flow charts and other diagrams. Each block in the flowcharts or blocks may represent a module, a program, or a part of codes, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

For the multi-TRP/panel transmission, many aspects are required to be addressed, including for example:

Enhancements on MU-MIMO support:

Specify overhead reduction, based on Type II CSI feedback, taking into account the tradeoff between performance and overhead Perform study and, if needed, specify extension of Type II CSI feedback to rank >2

Enhancements on multi-TRP/panel transmission including improved reliability and robustness with both ideal and non-ideal backhaul:

Specify downlink control signaling enhancement(s) for efficient support of non-coherent joint transmission Perform study and, if needed, specify enhancements on uplink control signaling and/or reference signal(s) for non-coherent joint transmission Multi-TRP techniques for URLLC requirements are included in this WI Enhancements on multi-beam operation, primarily targeting FR2 operation:

Perform study and, if needed, specify enhancement(s) on UL and/or DL transmit beam selection specified in Rel-15 to reduce latency and overhead Specify UL transmit beam selection for multi-panel operation that facilitates panel-specific beam selection Specify a beam failure recovery for SCell based on the beam failure recovery specified in Rel-15

Specify measurement and reporting of either L1-Reference Signal Receiving Quality (RSRQ) or L1-Signal to Interference plus Noise Ratio (SINR)

Perform study and make conclusion in the first RAN1 meeting after start of the WI, and if needed, specify CSI-RS and DMRS (both downlink and uplink) enhancement for PAPR reduction for one or multiple layers (no change on RE mapping specified in Rel-15).

Form the above aspects, it can be seen that for the multi-TRP/panel transmission, downlink control signaling enhancement(s) is required for efficient support of non-coherent joint transmission. Especially, it requires more DMRS indications to indicate the DMRS port sets. As one option, it is possible to use the legacy DMRS table and add more indications but the capacity of the legacy DMRS table is limited and thus the number of added indications is restricted too. As another option, a new DMRS table can be introduced and two different transmission configuration indication (TCI) states in one TCI code point can be used to implicitly indicate which one of the legacy DMRS table and the new DRMS table shall be used.

In addition, it was also proposed to add some new entries for the DMRS table, for example, 1+1, 1+2, 2+1, 2+2, 1+3, and 3+1 for one CW case. Particularly, in 3GPP technical document R1-1904013, it was proposed a modification to the legacy DMRS table and five more entries were introduced to support more DMRS port sets for multi-TRP transmissions as illustrated in FIG. 1 which illustrates a DRMS table 100 with the newly added port configurations indicated by the grey color.

In the single PDCCH based multi-TRP transmission, one PDCCH is used to schedule PDSCH with layers from different TRPs. A case might occur in which the terminal device does not successfully receive at least data part from at least one TRPs fails. For two CWs, ACK/NACK feedback and retransmission are separately for each CW and thus the network could know which one layer is failed and the retransmission can be adapted accordingly. While for one CW case, it can use only one ACK/NACK for the two layers. Thus, if one TRP is getting worse, it's better to quickly adapt the transmission. However, the network does not know the state of two layers and the performance could not be improved.

Embodiments of the present disclosure provide a solution of downlink retransmission for multi-TRP/panel transmission. The basic idea is to transmit, in response to receiving a negative feedback for a downlink transmission based on multi-TRP/panel transmission, perform the downlink retransmission with a different layer mapping. Different from the existing fixed layer mapping scheme for different DMRS indication entries, in embodiments of the present disclosure, the failed data has by means of the change of the layer set mapping, a chance to be transmitted on a better channel, which means more diversity gain and thus better retransmission performance.

Please be noted that basic idea and embodiments of the present disclosure can be used for the multi-TRP transmission. When they are used for the multi-TRP transmission, a data block is divided into at least two data parts, and the at least two data parts are transmitted with different transmission configuration indication (TCI) states through different TRPs. It is to be also understood that the basic idea and embodiments disclosed herein may also be used for the multiple panel transmission, wherein a panel denotes a group of antennas on the network device and/or user terminal device and the multiple panel transmission means transmission using multiple panels for single user device. When the basic idea and embodiments are used for the multiple panel transmission, a data block is divided into at least two data parts, and the at least two data parts are transmitted with different transmission configuration indication (TCI) states through different panels.

Hereinafter, reference will be made to FIGS. 2 to 8 to describe solutions as proposed in the present disclosure in details by taking the multi-TRP transmission as an example. However, it shall be appreciated that following embodiments are given only for illustrative purposes and the present disclosure is not limited thereto. In fact, as mentioned above, embodiments of the present disclosure can be used for the multiple panel transmission as well. Besides, two-TRP transmission is taken as an example to describe embodiments of the present disclosure, and the present disclosure is not limited thereto, three-TRP transmission or even more TRP transmission is also possible. And more especially, different embodiments as described herein can be implemented alone and separately or combined in any suitable manner as long as it is feasible from a point of the technical view.

FIG. 2 illustrates an example scenario of multi-TRP transmission in which the present disclosure can be implemented. In FIG. 2, a two-TRP transmission is illustrated in which a single UE 210 can be served by two TRPs 220, 230. As illustrated, the UE 210 could receive signals from both TRPs 220 and TRP 230 at the same time. While the transmission to the UE might fail and thus NACK shall be fed back to the network device to request a retransmission. Embodiments of the present disclosure are just directed to such an example scenario to provide a new solution for data retransmission.

FIG. 3 schematically illustrates a flow chart of a method for downlink transmission according to some embodiments of the present disclosure. The method 300 may be performed at a network device, for example a base station like gNB or other like network devices.

As illustrated in FIG. 3, in block 310, the network device may receive, from a terminal device, a feedback for a downlink transmission. The downlink transmission is performed through multiple TRPs/panels. In the downlink transmission, a data block is divided into at least a first data part and a second data part, the first data part is mapped to a first set of layers and a second data part is mapped to a second set of layers, and the first data part and the second data part are transmitted with different transmission configuration indication (TCI) states. By means of the different TCI states, it enables the multi-TRP/panel transmission.

Next in block 320, the network device performs, in response to the feedback indicating a transmission failure, a downlink retransmission of at least one of the first data part and the second data part with the at least one of the first data part and the second data part being mapped to a different set of layers from one used in the downlink transmission.

In embodiments of the present application, during the downlink transmission, the layer set mapping will be changed, which means that the failed data part could have a change to be transmitted on the better channel. Thus, the more diversity gain can be achieved and thereby the retransmission performance could be improved.

Figure 4:
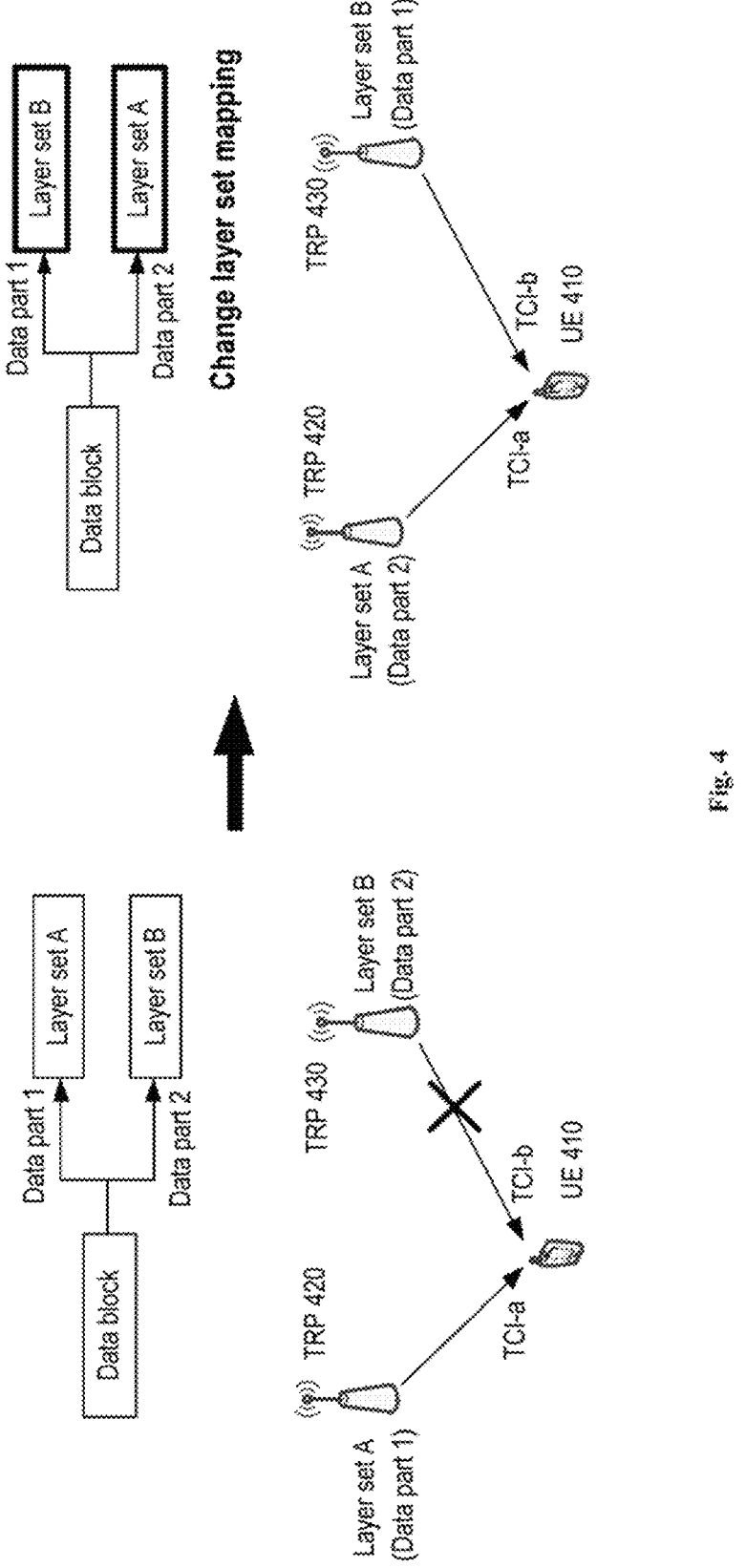
FIG. 4 schematically illustrates a diagram of downlink retransmission for two-TRP transmission according to some embodiments of the present disclosure.

FIG. 4 schematically illustrates a diagram of downlink retransmission for two-TRP transmission according to some embodiments of the present disclosure, wherein the UE 410 is served by two TRPs with two different TCI states, TCI-a and TCI-b. As illustrated in FIG. 4, the data block, e.g. a CW, is split into two data parts, data part 1 and data part 2, wherein data part 1 is mapped onto a first set of layers, layer set A, and data part 2 is mapped onto a second set of layers, layer set B. Then, the data part 1 is transmitted through TRP 420 with a TCI state TCI-a and the data part 2 is transmitted to through TRP 430 with another TCI state, TCI-b. The UE receives the data part 1 and the data part 2 from the two TRPs. If both of the two data parts are received successfully, then an ACK could be fed back to the network device. If neither of them is received successfully, or only one of them is received successfully, a NACK can be fed back to the network device.

In a case when a NACK is received from the UE, the network device may decide to perform a downlink retransmission but change the layer set mapping. Particularly, the data part 1 can be mapped onto the layer set B and the data part 2 is mapped onto the layer set A as illustrated in FIG. 4. In such a way, in the downlink retransmission, the data part 1 can be transmitted through TRP 430 while the data part 2 can be transmitted through 420. Thus, the more diversity gain can be achieved and thereby the retransmission performance could be improved.

In some embodiments of the present disclosure, all data parts can be transmitted, each of them is mapped onto a different set of layers from one used in the previous downlink transmission. For example, both the first data part and the second data part, the first data part is mapped to a different set of layers from the first set of layers and the second data part is mapped to another different set of layers from the second set of layers, which can be used in for example, three-TRP transmission. For another example, both the first data part and the second data part, the first data part is mapped to the second set of layers and the second data part is mapped to the first set of layers. That is to say, the layer set mapping could be swapped, just as illustrated in FIG. 4, which can be used in for example, two-TRP transmission.

In some embodiments of the present disclosure, layer set mapping information may be transmitted to the terminal device to indicate the at least one of the first data part and the second data part being mapped to a different set of layers from one used in the downlink transmission. The layer set mapping information can be carried by a demodulation reference signal (DMRS) indication for the downlink retransmission. The DMRS indication may be transmitted in, for example, downlink control indication (DCI) for the downlink retransmission.

Figure 5A:
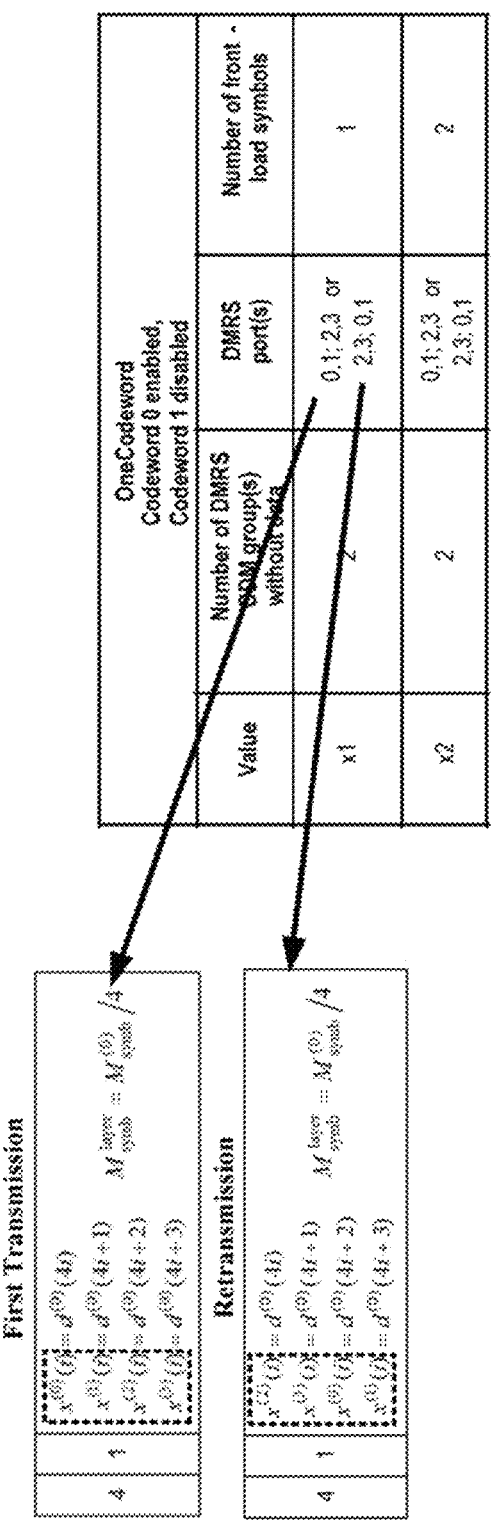
FIGS. 5A to 5D schematically illustrate example DMRS tables for multi-TRP transmission according to some embodiments of the present disclosure.

In some embodiments of the present disclosure, for the initial downlink retransmission and the downlink retransmission, the DMRS indication could be similar and the UE could determine which layer set mapping is used since the UE could know whether the transmission is a retransmission. FIG. 5A illustrates a DMRS table, which can be used in the solution as proposed in the present disclosure. As illustrated in FIG. 5A, in the DMRS table, a DMRS indication could be used to indicate two alternative layer set mappings. Taking DMRS indication value x1 as an example, it could indicate a first layer set mapping (0, 1; 2, 3) with data part 1 being mapped onto layer set (0, 1) and data part 2 being mapped onto layer set (2, 3) and a second layer set mapping (2, 3; 0, 1) with data part 1 being mapped onto layer set (2, 3) and data part 2 being mapped onto layer set (0, 1). If it is an initial downlink retransmission, the terminal device could determine that the first layer set mapping is used; if it is a second downlink retransmission, the terminal device could determine that the second layer set mapping is used.

In some embodiments, a data block may be split into a set of data streams, and the set of data streams may be mapped to a set of DMRS ports. The set of DMRS ports may be divided into two groups (for example, Group 1 and Group 2, and there may be M ports in Group 1, and N ports in Group 2, wherein M and N are positive integer, and M can be same with or different from N). The set of data streams may be divided into two groups. For example, Group A and Group B, or Group C and Group D. and there are M data streams in Group A and N data streams in Group B, and there are M data streams in Group C and N data streams in Group D. And at least one data stream in Group A is different from any data stream in Group C, and at least one data stream in Group B is different from any data stream in Group D.

In some embodiments, in the DMRS table, there may be two DMRS indications (DMRS indication W and DMRS indication V) with same value of the number of FL DMRS symbols, the number of DMRS CDM groups without data, and the number of DMRS ports, and/or the same indices of DMRS ports. And the data stream mapping for DMRS indication W and DMRS indication V may be different. For example, the DMRS indication W may be used to indicate the M data streams in Group A are mapped to DMRS ports Group 1, and N data streams in Group B are mapped to DMRS ports Group 2. And the DMRS indication V may be used to indicate the M data streams in Group C are mapped to DMRS ports Group 1, and N data streams in Group D are mapped to DMRS ports Group 2.

In some embodiments, in the DMRS table, for a given DMRS indication, and the data stream mapping for different occasions of data transmission may be different, for example new data transmission and retransmission of the same data with a different redundant version. For example, the given DMRS indication with new data transmission, the M data streams in Group A are mapped to DMRS ports Group 1, and N data streams in Group B are mapped to DMRS ports Group 2. And the given DMRS indications with retransmission of the same data with a different redundant version, the M data streams in Group C are mapped to DMRS ports Group 1, and N data streams in Group D are mapped to DMRS ports Group 2.

In some embodiments, one TCI code point with two TCI states may be configured (for example, TCI-a and TCI-b), and a set of DMRS ports may be configured, and the set of DMRS ports may be divided into two groups (for example, Group 1 and Group 2, and there may be M ports in Group 1, and N ports in Group 2, wherein M and N are positive integer, and M can be same with or different from N). In one embodiment, in the DMRS table, there may be two DMRS indications (DMRS indication W and DMRS indication V) with same value of the number of FL DMRS symbols, the number of DMRS CDM groups without data, and the number of DMRS ports, and/or the same indices of DMRS ports. And the TCI state associations for DMRS indication W and DMRS indication V may be different. For example, the DMRS indication W may be used to indicate the TCI-a associated to DMRS ports Group 1, and TCI-b associated to DMRS ports Group 2. And the DMRS indication V may be used to indicate TCI-b associated to DMRS ports Group 1, and TCI-a associated to DMRS ports Group 2. In another embodiment, in the DMRS table, for a given DMRS indication, and the TCI state association for different occasions of data transmission may be different, for example new data transmission and retransmission of the same data with a different redundant version. For example, for the given DMRS indication with new data transmission, TCI-a is associated to DMRS ports Group 1, and TCI-b is associated to DMRS ports Group 2. And for the given DMRS indications with retransmission of the same data with a different redundant version, TCI-b is associated to DMRS ports Group 1, and TCI-a is associated to DMRS ports Group 2.

In some embodiments of the present disclosure, the DMRS table could be enhanced with two or more DMRS indication with the same value of at least one of the number of FL DMRS symbols, the number of CDM groups without data, and the number of DMRS ports), and/or the same indices of DMRS ports. For example, one DMRS indication may be used to indicate a first layer set mapping with a first data part being mapped to layer set A, and a second data part being mapped onto layer set B, and the other indication is used to indicate a second layer set mapping with a first data part being mapped onto layer set B, and a second data part being mapped onto layer set A. For DMRS type 1 with maximum 2 front-load DMRS symbols and 4 layers transmission, FIG. 5B or 5C can be used.

Figure 5B:
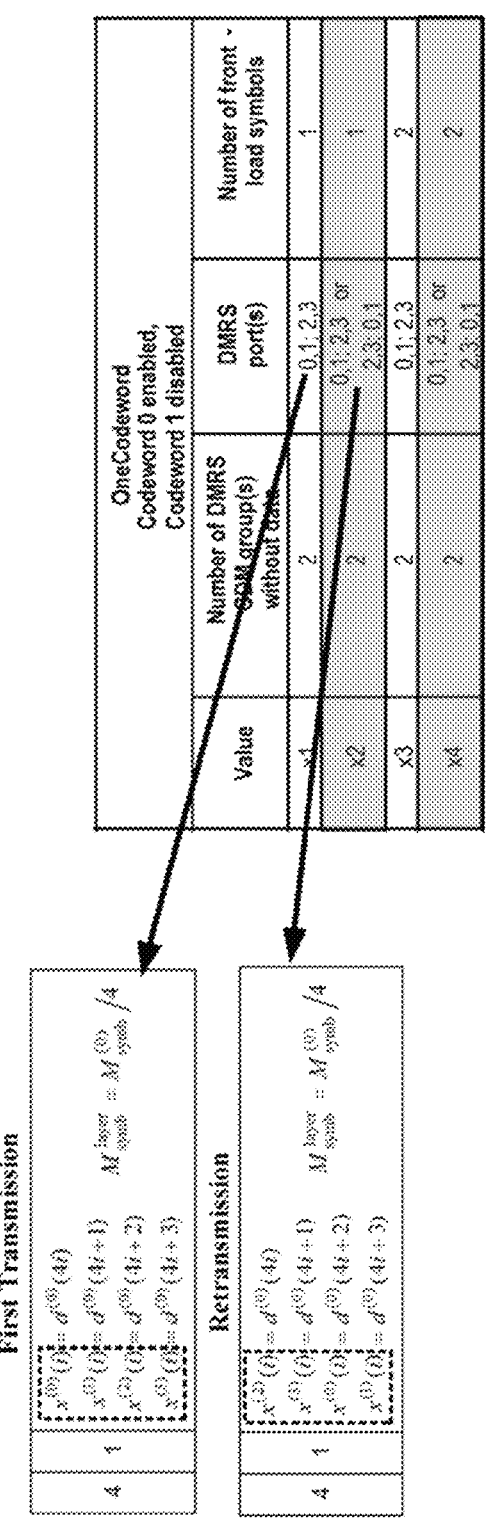

FIG. 5B illustrates another DMRS table, which can be used in the solution as proposed in the present disclosure. As illustrated in FIG. 5B, in addition to DMRS indications (x2 and x4) similar to those in FIG. 5A, it is also possible to include in the DMRS table DMRS entries, such as those corresponding to DMRS indication value of x1 and x3, which indicate only one layer set mapping (0, 1; 2, 3) with data part 1 being mapped onto layer set (0, 1) and data part 2 being mapped onto layer set (2, 3). These indications x1 and x3 can be used for the UE which does not support the change of layer set mappings to provide the downward-compatibility.

Figure 5C:
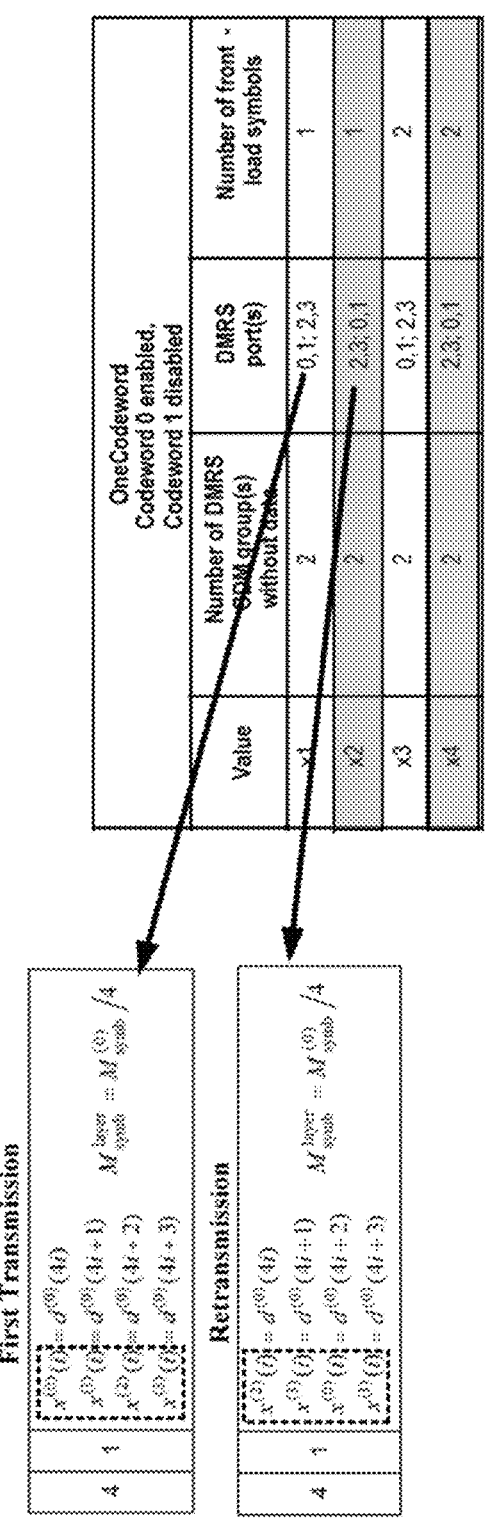

FIG. 5C illustrates s further DMRS table, which can be used in the solution as proposed in the present disclosure, wherein the DMRS indications x1 and x3 are used to indicate a first layer set mapping (0, 1; 2, 3) with data part 1 being mapped onto layer set (0, 1) and data part 2 being mapped onto layer set (2, 3), and the DMRS indications x2 and x4 are used to indicate a second layer set mapping (2, 3; 0, 1) with data part 1 being mapped onto layer set (2, 3) and data part 2 being mapped onto layer set (0, 1). In such a way, for the UE which does not support the change of layer set mappings, the DMRS indications for the initial downlink transmission and the downlink retransmission can be the same, while for the UE which supports the change of layer set mappings, the DMRS indications for the initial downlink transmission and the downlink retransmission can be different. Thus, it could also provide the downward-compatibility for the UE which does not support the change of layer set mappings.

Figure 5D:
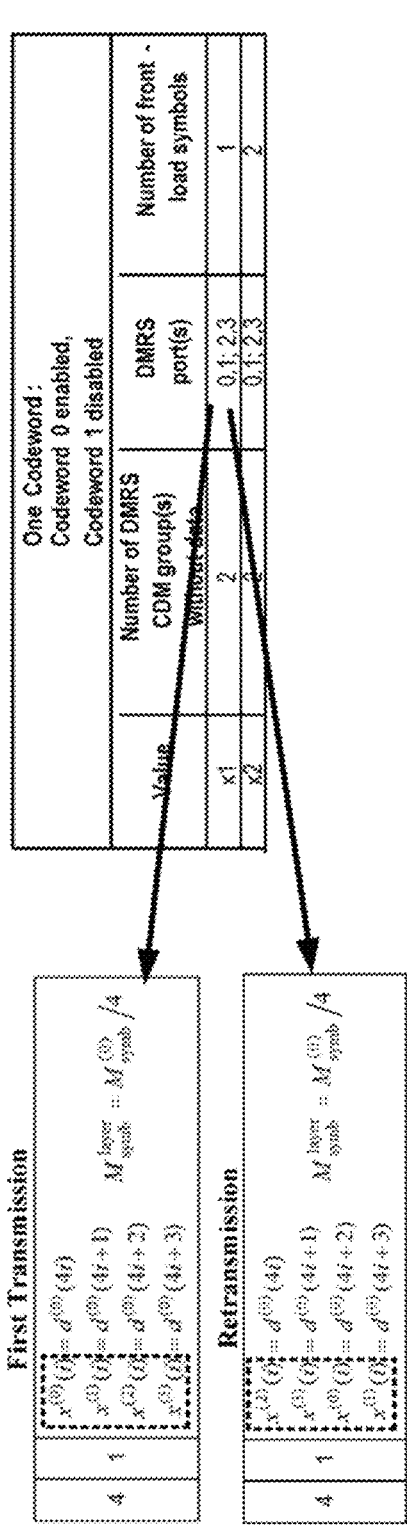

In some embodiments of the present disclosure, the DMRS table could contain no any duplicate for indication entries but the gNB and UE could follow the predetermined change mode of the layer set mapping and no additional indication is needed. FIG. 5D illustrates a further example DMRS table, which can be used in the solution as proposed in the present disclosure. As illustrated in FIG. 5D, there is only contained one DMRS for a same number of front-load symbols, the DMRS only defines one layer set mapping with data part 1 being mapped onto layer set (0, 1) and data part 2 being mapped onto layer set (2, 3). Thus, the DMRS indications for the initial downlink transmission and the downlink retransmission will always be the same, while a predetermined layer set mapping, for example (2, 3; 0, 1) with data part 1 being mapped onto layer set (2, 3) and data part 2 being mapped onto layer set (0, 1), can be used for the downlink retransmission as illustrated in FIG. 5D. The predetermined layer set mapping can be a fixed on which is known by both the network device and the terminal device, or it could be semi-statically and notify the terminal device through a higher layer signaling.

It shall be noticed that the above DMRS tables are just given to illustrate the embodiments of the present disclosure, and the present disclosure is not limited thereto. In fact, it is possible to make many modifications to the DMRS tables within the scope of spirt of the present disclosure.

In some embodiments of the present disclosure, the UE could inform the network device of transmission states of different data parts. The UE can measure the quality based on different sets of DMRS ports, and feed the state back explicitly. For example, the UE could use two bits to explicitly feed ACK NACK for two set of DMRS ports back to the network device, just like the case for two CWs.

In some embodiments of the present disclosure, the UE could implicitly inform the network device of the transmission states of the first data part and the second data part. Different transmission states of the data parts may be implicitly indicated with different PUCCH resources for transmission the feedback. FIG. 6 schematically illustrates an example transmission state indication table for two-TRP transmission according to some embodiments of the present disclosure. As illustrated in FIG. 6, the PUCCH resource could use two different resources, for example PUCCH resource 1 and PUCCH resource 2. If the NACK is transmission on PUCCH resource 1, it indicates that TRP 1 is worse than TRP 2; if the NACK is transmission on PUCCH resource 1, it indicates that TRP 2 is worse than TRP 1. The PUCCH resource used herein could be one or more of the time/frequency resource, sequences for PUCCH transmission, scrambling codes, cyclic shifting for the feedback, and etc.

By means of the explicit or implicit indication, the network device could learn the transmission states of respectively data parts and thus, it is possible to perform the downlink retransmission only on a data part in a failed state indicated by the feedback or the PUCCH resource for the feedback.

In another aspect of the present disclosure, there is further provided a method for downlink retransmission at the terminal device and hereinafter reference will be made to FIG. 7 to describe embodiments of the present disclosure.

FIG. 7 further illustrates a flow chart of a method for wireless transmission according to some embodiments of the present disclosure. The method 700 may be performed at a terminal device, for example a mobile terminal like UE or other like device.

As illustrated in FIG. 7, first in block 710, the terminal device may transmit, to a network device, a feedback for a downlink transmission. In the downlink transmission, a data block is divided into at least a first data part and a second data part, the first data part is mapped to a first set of layers and a second data part is mapped to a second set of layers, and the first data part and the second data part are transmitted with different TCI states.

In block 720, the terminal device may further receive, in response to the feedback indicating a transmission failure, a downlink retransmission of at least one of the first data part and the second data part, wherein the at least one of the first data part and the second data part is mapped to a different set of layers from one used in the downlink transmission/

Then in step 730, the terminal device decodes the data block based on at least partly the downlink retransmission.

In some embodiments of the present disclosure, the receiving a downlink retransmission may include: receiving a retransmission of both the first data part and the second data part, wherein the first data part is mapped to a different set of layers from the first set of layers and the second data part is mapped to another different set of layers from the second set of layers.

In some embodiments of the present disclosure, the receiving a downlink retransmission may include: receiving a retransmission of both the first data part and the second data part, wherein the first data part is mapped to the second set of layers and the second data part being mapped to the first set of layers.

In some embodiments of the present disclosure, the method 700 may further include: receiving, from the network device, layer set mapping information indicating the at least one of the first data part and the second data part being mapped to a different set of layers from one used in the downlink transmission.

In some embodiments of the present disclosure, the layer set mapping information may be carried by a demodulation reference signal (DMRS) indication for the downlink retransmission.

In some embodiments of the present disclosure, the DMRS indication for the downlink retransmission may have a value different from a DMRS indication for the downlink transmission.

In some embodiments of the present disclosure, the DRMS indication for the downlink retransmission may indicate at least two layer set mappings for the downlink transmission and the downlink retransmission respectively, and the DMRS indication for the downlink retransmission may have a same value as a DMRS indication for the downlink transmission.

In some embodiments of the present disclosure, wherein the feedback may include at least two feedback values for transmission states of the first data part and the second data part respectively.

In some embodiments of the present disclosure, the feedback may be a single feedback for the first data part and the second data part, and wherein the feedback is transmitted on a physical uplink control channel and a resource for the PUCCH may be used to indicate transmission states of the first data part and the second data part.

In some embodiments of the present disclosure, the at least one of the first data part and the second data part may be a data part in a failed state indicated by the feedback or the resource for the PUCCH.

Hereinbefore, method 700 implemented at the terminal device is described with reference to FIG. 7 in brief. It can be noted that for details about the operations of method 700, one may refer to those descriptions made with respect to the respective steps of the methods with reference to FIGS. 2 to 6.

In a further aspect, an apparatus for performing the method 300 or 700 may include means for performing the respective steps of the method 300 or 700. The means may be implemented in any suitable form. For example, the means may be implemented in a circuitry or software module.

In some example embodiments of the present disclosure, an apparatus for performing the method 300 may include means for receiving, from a terminal device, a feedback for a downlink transmission, wherein in the downlink transmission, a data block is divided into at least a first data part and a second data part, the first data part is mapped to a first set of layers and a second data part is mapped to a second set of layers, and the first data part and the second data part are transmitted with different transmission configuration indication (TCI) states; and means for performing, in response to the feedback indicating a transmission failure, a downlink retransmission of at least one of the first data part and the second data part with the at least one of the first data part and the second data part being mapped to a different set of layers from one used in the downlink transmission.

In some example embodiments of the present disclosure, the means for performing a downlink retransmission may be further configured to retransmit both the first data part and the second data part, wherein the first data part is mapped to a different set of layers from the first set of layers and the second data part is mapped to another different set of layers from the second set of layers.

In some example embodiments of the present disclosure, the means for performing a downlink retransmission may be further configured to retransmit both the first data part and the second data part, wherein the first data part is mapped to the second set of layers and the second data part is mapped to the first set of layers.

In some example embodiments of the present disclosure, the apparatus may further include means for transmitting layer set mapping information to the terminal device to indicate the at least one of the first data part and the second data part being mapped to a different set of layers from one used in the downlink transmission.

In some example embodiments of the present disclosure, the layer set mapping information may be carried by a demodulation reference signal (DMRS) indication for the downlink retransmission.

In some example embodiments of the present disclosure, the DMRS indication for the downlink retransmission may have a value different from a DMRS indication for the downlink transmission.

In some example embodiments of the present disclosure, the DRMS indication for the downlink retransmission may indicate at least two layer set mappings for the downlink transmission and the downlink retransmission respectively, and the DMRS indication for the downlink retransmission may have a same value as a DMRS indication for the downlink transmission.

In some example embodiments of the present disclosure, the feedback include at least two feedback values for transmission states of the first data part and the second data part respectively.

In some example embodiments of the present disclosure, the feedback may be a single feedback for both the first data part and the second data part, and wherein the feedback is transmitted on a physical uplink control channel and a resource for the PUCCH may be used to indicate transmission states of the first data part and the second data part.

In some example embodiments of the present disclosure, at least one of the first data part and the second data part may contain only a data part in a failed state indicated by the feedback or the resource for the PUCCH.

In a further aspect of the present disclosure, an apparatus for performing the method 700 may include means for transmitting, to a network device, a feedback for a downlink transmission, wherein in the downlink transmission, a data block is divided into at least a first data part and a second data part, the first data part is mapped to a first set of layers and a second data part is mapped to a second set of layers, and the first data part and the second data part are transmitted with different TCI states; means for receiving, in response to the feedback indicating a transmission failure, a downlink retransmission of at least one of the first data part and the second data part, wherein the at least one of the first data part and the second data part is mapped to a different set of layers from one used in the downlink transmission; and means for decoding the data block based on at least partly the downlink retransmission.

In some example embodiments of the present disclosure, the means for receiving a downlink retransmission may be further configured to receive a retransmission of both the first data part and the second data part, wherein the first data part is mapped to a different set of layers from the first set of layers and the second data part is mapped to another different set of layers from the second set of layers.

In some example embodiments of the present disclosure, the means for receiving a downlink retransmission may be further configured to receive a retransmission of both the first data part and the second data part, wherein the first data part is mapped to the second set of layers and the second data part being mapped to the first set of layers.

In some example embodiments of the present disclosure, the apparatus may further include means for receiving layer set mapping information from the network device to indicate the at least one of the first data part and the second data part being mapped to a different set of layers from one used in the downlink transmission.

In some example embodiments of the present disclosure, the layer set mapping information may be carried by a demodulation reference signal (DMRS) indication for the downlink retransmission.

In some example embodiments of the present disclosure, the DMRS indication for the downlink retransmission may a value different from a DMRS indication for the downlink transmission.

In some example embodiments of the present disclosure, the DRMS indication for the downlink retransmission indicates at least two layer set mappings for the downlink transmission and the downlink retransmission respectively, and the DMRS indication for the downlink retransmission may have a same value as a DMRS indication for the downlink transmission.

In some example embodiments of the present disclosure, the feedback include at least two feedback values for transmission states of the first data part and the second data part respectively.

In some example embodiments of the present disclosure, the feedback is a single feedback for both the first data part and the second data part, and wherein the feedback is transmitted on a physical uplink control channel and a resource for the PUCCH is used to indicate transmission states of the first data part and the second data part.

In some example embodiments of the present disclosure, at least one of the first data part and the second data part may contain only a data part in a failed state indicated by the feedback or the resource for the PUCCH.

Figure 8:
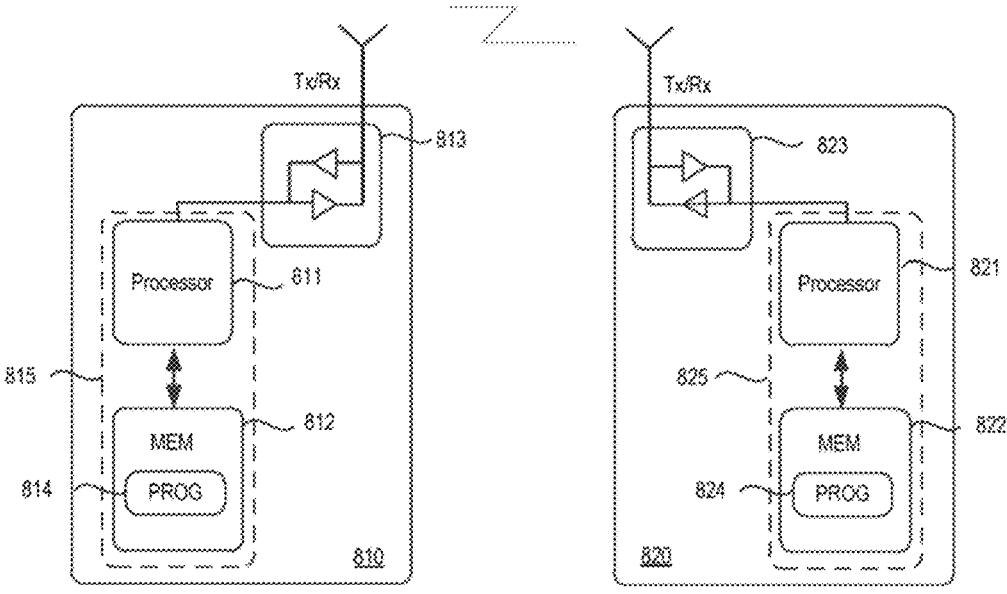
FIG. 8 schematically illustrates a simplified block diagram of an apparatus 810 that may be embodied as or comprised in a terminal device like UE, and an apparatus 820 that may be embodied as or comprised in a network device like gNB as described herein.

FIG. 8 schematically illustrates a simplified block diagram of an apparatus 810 that may be embodied as or comprised in a terminal device like UE, and an apparatus 820 that may be embodied as or comprised in a network device like gNB as described herein.

The apparatus 810 comprises at least one processor 811, such as a data processor (DP) and at least one memory (MEM) 812 coupled to the processor 811. The apparatus 810 may further include a transmitter TX and receiver RX 813 coupled to the processor 811, which may be operable to communicatively connect to the apparatus 820. The MEM 812 stores a program (PROG) 814. The PROG 814 may include instructions that, when executed on the associated processor 811, enable the apparatus 810 to operate in accordance with embodiments of the present disclosure, for example method 700. A combination of the at least one processor 811 and the at least one MEM 812 may form processing means 815 adapted to implement various embodiments of the present disclosure.

The apparatus 820 comprises at least one processor 811, such as a DP, and at least one MEM 822 coupled to the processor 811. The apparatus 820 may further include a suitable TX/RX 823 coupled to the processor 821, which may be operable for wireless communication with the apparatus 810. The MEM 822 stores a PROG 824. The PROG 824 may include instructions that, when executed on the associated processor 821, enable the apparatus 820 to operate in accordance with the embodiments of the present disclosure, for example to perform method 300. A combination of the at least one processor 821 and the at least one MEM 822 may form processing means 825 adapted to implement various embodiments of the present disclosure.

Various embodiments of the present disclosure may be implemented by computer program executable by one or more of the processors 811, 821, software, firmware, hardware or in a combination thereof.

The MEMs 812 and 822 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 811 and 821 may be of any type suitable to the local technical environment, and may include one or more of general purpose computers, special purpose computers, microprocessors, digital signal processors DSPs and processors based on multicore processor architecture, as non-limiting examples.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

The techniques described herein may be implemented by various means so that an apparatus implementing one or more functions of a corresponding apparatus described with an embodiment comprises not only prior art means, but also means for implementing one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for wireless transmission performed by a terminal device, comprising:

receiving, from a network device, a first downlink transmission scheduled by a downlink control information (DCI) based on a first demodulation reference signal (DMRS) indication, wherein:

in the first downlink transmission, a data block is mapped to a set of layers that correspond to a first group and a second group, the first group corresponds to a first transmission configuration indicator (TCI) state and the second group corresponds to a second TCI state, in the first downlink transmission, a first redundant version of the data block is received in a first occasion and a second redundant version of the data block is received in a second occasion, the first occasion is associated with the first TCI state and the second occasion is associated with the second TCI state, the first group corresponds to a first number of layers and the second group corresponds to a second number of layers in a case where the first DMRS indication is indicated, the first group corresponds to the second number of layers and the second group corresponds to the first number of layers in a case where a second DMRS indication is indicated, and the first number of layers is different from the second number of layers;

transmitting, to the network device, a feedback for the first downlink transmission; and receiving, from the network device, a second downlink transmission based on the second DMRS indication, wherein the second downlink transmission is in response to the feedback indicating a transmission failure for the first downlink transmission.

2. The method of claim 1, wherein the set of layers comprises a third number of layers, and the third number is a sum of the first number of layers and the second number of layers.

3. The method of claim 1, wherein:

in the first downlink transmission, the data block corresponds to a set of DMRS ports that comprises the first group and the second group, the set of DMRS ports comprises a third number of DMRS ports, the first group comprises a first number of DMRS ports and the second group comprises a second number of DMRS ports based on the first DMRS indication; and the first group comprises the second number of DMRS ports and the second group comprises the first number of DMRS ports based on the second DMRS indication.

4. The method of claim 1, further comprising:

receiving the DMRS indication in the DCI; and receiving a configuration of the first TCI state and the second TCI state.

5. The method of claim 1, wherein the first DMRS indication and the second DMRS indication indicates a same value of a number of front loaded DMRS symbols, a number of DMRS CDM groups without data, and a number of DMRS ports.

6. The method of claim 1, wherein:

the first downlink transmission corresponds to the first occasion, and the second downlink transmission corresponds to the second occasion.

7. A method performed by a network device, comprising:

transmitting, to a terminal device, a first downlink transmission scheduled by a downlink control information (DCI) based on a first demodulation reference signal (DMRS) indication, wherein:

in the first downlink transmission, a data block is mapped to a set of layers that correspond to a first group and a second group, the first group corresponds to a first transmission configuration indicator (TCI) state and the second group corresponds to a second TCI state, in the first downlink transmission, a first redundant version of the data block is transmitted in a first occasion and a second redundant version of the data block is transmitted in a second occasion, the first occasion is associated with the first TCI state and the second occasion is associated with the second TCI state, the first group corresponds to a first number of layers and the second group corresponds to a second number of layers in a case where the first DMRS indication is indicated, the first group corresponds to the second number of layers and the second group corresponds to the first number of layers in a case where a second DMRS indication is indicated, and the first number of layers is different from the second number of layers;

receiving, from the terminal device, a feedback for the first downlink transmission; and transmitting, to the terminal device, a second downlink transmission based on the second DMRS indication, wherein the second downlink transmission is in response to the feedback indicating a transmission failure for the first downlink transmission.

8. The method of claim 7, wherein the set of layers comprises a third number of layers, and the third number is a sum of the first number of layers and the second number of layers.

9. The method of claim 7, wherein:

in the first downlink transmission, the data block corresponds to a set of DMRS ports, the set of DMRS ports comprises the first group and the second group, and the set of DMRS ports comprises a third number of DMRS ports, wherein the first group comprises a first number of DMRS ports and the second group comprises a second number of DMRS ports based on the first DMRS indication; and the first group comprises the second number of DMRS ports and the second group comprises the first number of DMRS ports based on the second DMRS indication.

10. The method of claim 7, further comprising:

transmitting the DMRS indication in the DCI; and transmitting a configuration of the first TCI state and the second TCI state.

11. The method of claim 7, wherein the first DMRS indication and the second DMRS indication indicates a same value of a number of front loaded DMRS symbols, a number of DMRS CDM groups without data, and a number of DMRS ports.

12. The method of claim 7, wherein the first downlink transmission corresponds to the first occasion, and the second downlink transmission corresponds to the second occasion.

13. A terminal device comprising:

a processor configured to cause the terminal device to:

receive, from a network device, a first downlink transmission scheduled by a downlink control information (DCI) based on a first demodulation reference signal (DMRS) indication, wherein:

in the first downlink transmission, a data block is mapped to a set of layers that correspond to a first group and a second group, the first group corresponds to a first transmission configuration indicator (TCI) state and the second group corresponds to a second TCI state, in the first downlink transmission, a first redundant version of the data block is received in a first occasion and a second redundant version of the data block is received in a second occasion, the first occasion is associated with the first TCI state and the second occasion is associated with the second TCI state, the first group corresponds to a first number of layers and the second group corresponds to a second number of layers in a case where first DMRS indication is indicated, the first group corresponds to the second number of layers and the second group corresponds to the first number of layers in a case where a second DMRS indication is indicated, and the first number of layers is different from the second number of layers;

transmit, to the network device, a feedback for the first downlink transmission; and transmit, to the terminal device, a second downlink transmission based on the second DMRS indication, wherein the second downlink transmission is in response to the feedback indicating a transmission failure for the first downlink transmission.

14. The terminal device of claim 13, wherein the set of layers comprises a third number of layers, and the third number is a sum of the first number of layers and the second number of layers.

15. The terminal device of claim 13, wherein:

in the first downlink transmission, the data block corresponds to a set of DMRS ports comprising the first group and the second group, and the set of DMRS ports comprises a third number of DMRS ports, the first group comprises a first number of DMRS ports and the second group comprises a second number of DMRS ports based on the first DMRS indication, and the first group comprises the second number of DMRS ports and the second group comprises the first number of DMRS ports based on the second DMRS indication.

16. The terminal device of claim 13, the terminal device is further caused to:

receive the DMRS indication in the DCI; and receive a configuration of the first TCI state and the second TCI state.

* * * * *